Jan. 19, 1937. F. PAUS 2,068,467
CULTIVATOR AND SHIELD
Filed July 27, 1936

Frank Paus,
INVENTOR

BY *Victor J. Evans & Co.*
ATTORNEYS

*P. T. Hickey.*
WITNESS

Patented Jan. 19, 1937

2,068,467

UNITED STATES PATENT OFFICE 2,068,467

CULTIVATOR AND SHIELD

Frank Paus, Eitzen, Minn.

Application July 27, 1936, Serial No. 92,883

2 Claims. (Cl. 97—210)

This invention relates to cultivators and shields and has for an object to provide a colter and cultivator blade mounted on a common standard, the colter forming a shield for preventing the dirt from being thrown from the cultivator blade upon young plants, the colter enabling the cultivator to approach near to the rows of corn or like plants which are being cultivated without the roots being torn by the cultivator blade.

A further object is to provide a novel standard having means for effecting various vertical and horizontal adjustments of the colter relative to the cultivator blade and having means for so mounting the cultivator blade that a shear pin will be broken when the blade encounters a rigid obstruction and permit the blade to yield so that breakage of the parts will be positively prevented.

A further object is to provide a cultivator shield assembly which will consist of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 3:
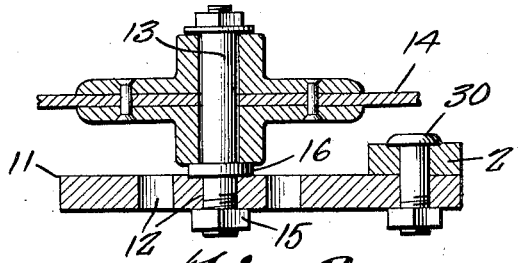
Figure 3 is a cross sectional view taken on the broken line 3—3 of Figure 1.

Referring now to the drawing in which like characters of reference designate similar parts in the various views, 10 designates a standard which may be secured to a cultivator frame in any conventional manner and which is provided at the lower end with a substantially oblong plate 11 having formed therein vertical rows of openings 12 adapted to interchangeably receive the shaft 13 of a colter 14, the shaft being anchored in any adjusted position by a nut 15 which clamps the plate 11 against a shoulder 16 on the shaft, as best shown in Figure 3.

Figure 1:
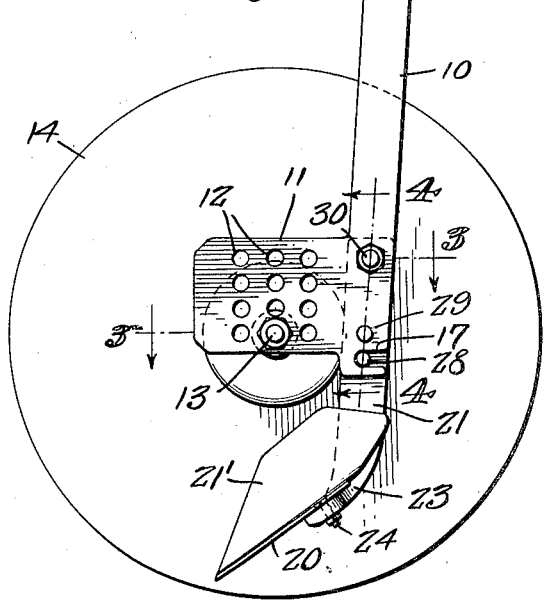
Figure 1 is a side elevation of a colter shield and cultivator blade assembly constructed in accordance with the invention.
Figure 4:
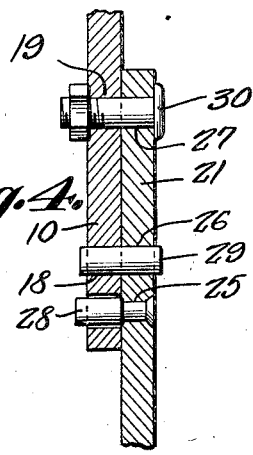
Figure 4 is an enlarged detail sectional view taken on the line 4—4 of Figure 1.

The standard 10 is provided at the bottom with a slot 17 as best shown in Figures 1 and 4 and above the slot is provided with an opening 18, there being a second opening 19 formed in the standard above the opening 18 for mounting the cultivator blade, as will now be described.

Figure 2:
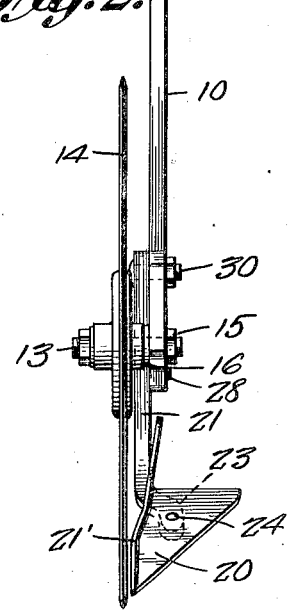
Figure 2 is a front elevation of the parts shown in Figure 1.

The cultivator blade 20 is substantially V-shaped in cross section, a portion of the inner side of the blade being offset as shown at 21 in Figure 2 to extend parallel with the face of the colter 14 at a short distance away from the colter. The blade is provided with a shank 22 having a goose neck 23, as best shown in Figure 2, which passes along the bottom face of the blade and is rigidly bolted thereto as shown at 24 in Figure 1. The shank is disposed between the standard 10 and the colter 14 and is provided with three aligned openings 25, 26, and 27.

A shouldered rivet 28 is passed through the lowermost opening 25 in the shank 21, the shoulder being adapted to ride into the slot 17 as best shown in Figure 1. A wood shear pin 29 is passed through the openings 26 and 18 in the shank and in the standard respectively. A bolt 30 is passed through the openings 27 and 19 in the shank and in the standard, respectively.

As best shown in Figure 1 when the shaft 13 of the colter is disposed in the lowermost center opening in the plate 11 of the standard, the point of the cultivator will be disposed a short distance above the bottom edge of the colter and forwardly of the vertical diameter of the colter. By selectively inserting the shaft 13 in any other of the openings 12 the point of the cultivator blade will be varied with respect to the edge of the colter to adapt the device for various conditions of service. Should a rigid obstruction be encountered by the cultivator blade the shear pin 29 will be broken allowing the cultivator blade to pivot on the bolt 30 and allowing the shoulder 28 of the rivet to pass rearwardly out of the slot 17 in the lower end of the standard so that the blade will yield and breakage of the parts will be eliminated.

From the above description it is thought that the construction and operation of the invention will be fully understood without further explanation.

What is claimed is:

1. In a cultivator, a standard, a shaft on the lower end of the standard, a colter on the shaft, a shank having a cultivator blade at the lower end, the shank extending along the standard between the colter and the standard, a bolt securing the shank to the standard, there being a groove in the standard at the lower end thereof, a projection on the standard received in said groove, and a shear pin passed through the standard and the shank adapted to permit the cultivator blade to rock on said bolt as a pivot and permit the projection to ride out of the slot when a rigid obstruction is struck.

2. In a cultivator, a standard provided with a forwardly extending substantially oblong plate having vertical rows of openings therein, a shaft selectively interchangeably receivable in selected ones of said openings, a colter on the shaft, the lower end of the standard projecting below the plate and being provided in the rear side with an arcuate slot, a cultivator blade disposed laterally of the colter, a shank for the cultivator blade, a combined securing and pivot bolt for attaching the shank to the standard at substantially the center of curvature of said slot, a projection on the shank received in said slot, and a shear pin passed through the shank and the standard and breakable upon impact of the blade with a rigid obstruction to permit said projection riding out of the slot and permitting the blade to rock rearwardly on said bolt as a pivot and prevent breakage of the parts.

FRANK PAUS.